(12) United States Patent
Yang

(10) Patent No.: US 8,834,993 B2
(45) Date of Patent: Sep. 16, 2014

(54) THERMOPLASTIC SINGLE PLY PROTECTIVE COVERING

(71) Applicant: Building Materials Investment Corporation, Wilmington, DE (US)

(72) Inventor: Li-Ying Yang, Whippany, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 123 days.

(21) Appl. No.: 13/679,892

(22) Filed: Nov. 16, 2012

(65) Prior Publication Data

US 2013/0316157 A1      Nov. 28, 2013

Related U.S. Application Data

(60) Provisional application No. 61/568,125, filed on Dec. 7, 2011.

(51) Int. Cl.
| | | |
|---|---|---|
| B32B 7/02 | (2006.01) | |
| B32B 7/14 | (2006.01) | |
| E04D 5/06 | (2006.01) | |
| E04D 5/10 | (2006.01) | |
| C09J 7/02 | (2006.01) | |
| E04D 5/14 | (2006.01) | |

(52) U.S. Cl.
CPC ... *E04D 5/10* (2013.01); *B32B 7/02* (2013.01); *B32B 7/14* (2013.01); *C09J 7/0214* (2013.01); *C09J 2201/134* (2013.01); *C09J 2201/28* (2013.01); *C09J 2201/40* (2013.01); *C09J 2423/00* (2013.01); *C09J 2423/006* (2013.01); *E04D 5/148* (2013.01); *E04D 5/142* (2013.01)

USPC ..... 428/214; 428/212; 428/220; 428/355 EN; 428/189; 428/141; 156/65

(58) Field of Classification Search
CPC ............... C09J 7/0214; C09J 2201/134; C09J 2201/128; C09J 2201/40; E04D 5/10; E04D 5/142; E04D 5/148
USPC .................. 428/141, 189, 212–214, 220, 343, 428/345–355 N, 195.1, 192; 52/518–560, 52/309.1–309.17; 156/65
See application file for complete search history.

(56) References Cited

U.S. PATENT DOCUMENTS

| | | | | |
|---|---|---|---|---|
| 4,039,706 A | * | 8/1977 | Tajima et al. | ................. 428/40.3 |
| 4,535,015 A | | 8/1985 | Bruner et al. | |
| 4,910,059 A | | 3/1990 | Sancaktar | |
| 4,978,698 A | * | 12/1990 | Woodhams | ...................... 524/62 |

(Continued)

FOREIGN PATENT DOCUMENTS

| | | |
|---|---|---|
| EP | 0714963 A2 | 6/1996 |
| WO | 2004015216 A1 | 2/2004 |

OTHER PUBLICATIONS

International search report and written opinion of the international searching authority for PCT/US2012/065647 dated Apr. 5, 2013.

*Primary Examiner* — Prashant J Khatri
(74) *Attorney, Agent, or Firm* — Baker & McKenzie LLP

(57) ABSTRACT

A thermoplastic single ply protective roof covering may have two pressure sensitive rubber-based adhesive backings These dual-adhesive backings may be used to provide for a non-heat welded seam having a combination of good seam strength and fire performance.

13 Claims, 5 Drawing Sheets

(56) References Cited

U.S. PATENT DOCUMENTS

| | | |
|---|---|---|
| 7,666,941 B2 | 2/2010 | Shiba |
| 2004/0172908 A1 | 9/2004 | Swann |
| 2005/0217202 A1 | 10/2005 | Crook |
| 2006/0243388 A1 | 11/2006 | Kubiak et al. |

* cited by examiner

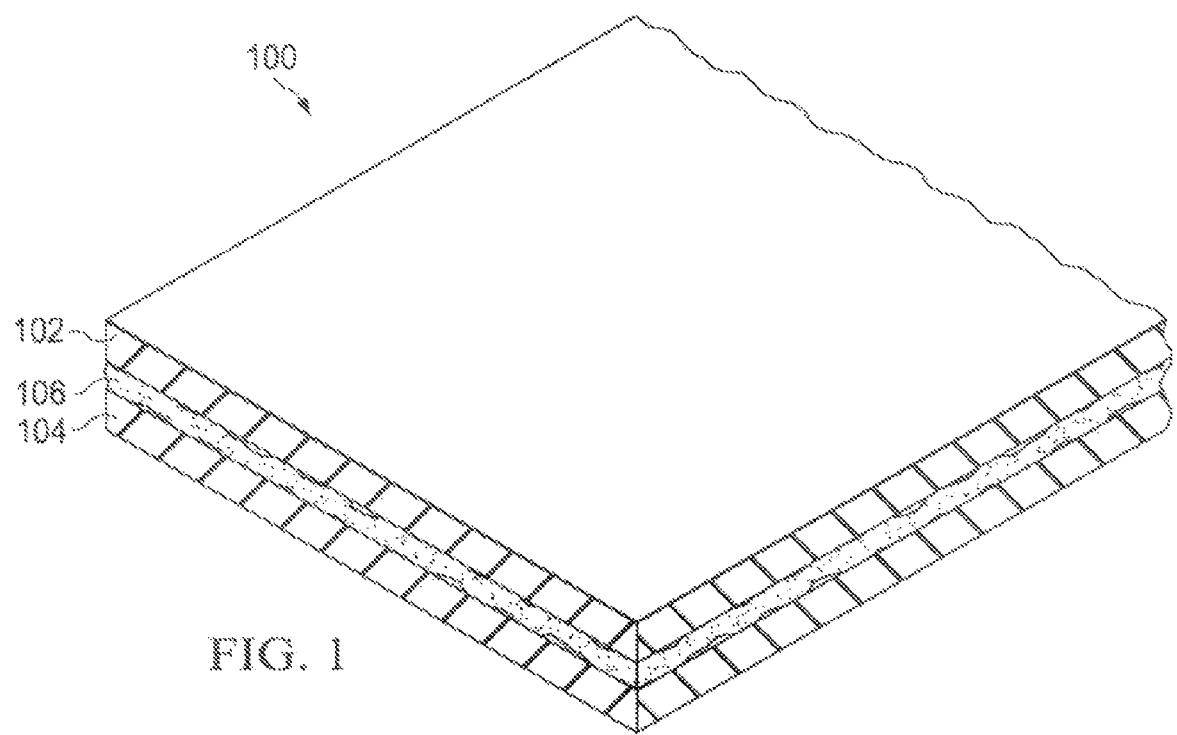

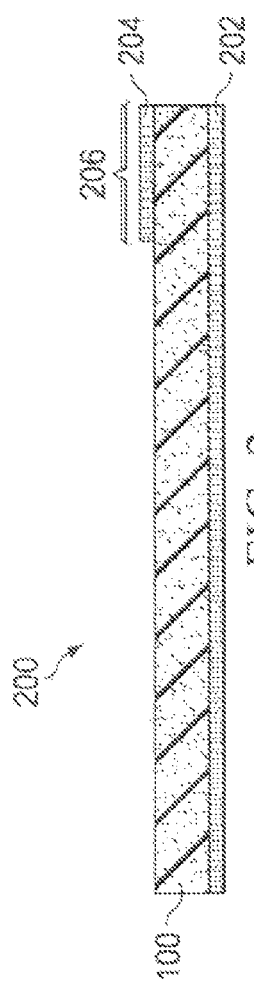
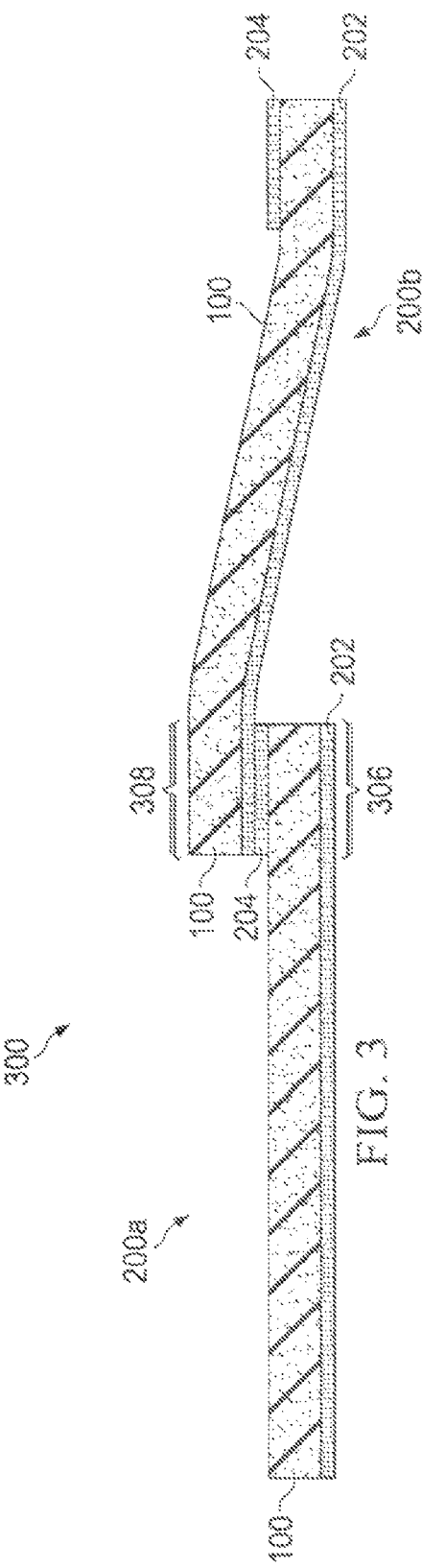

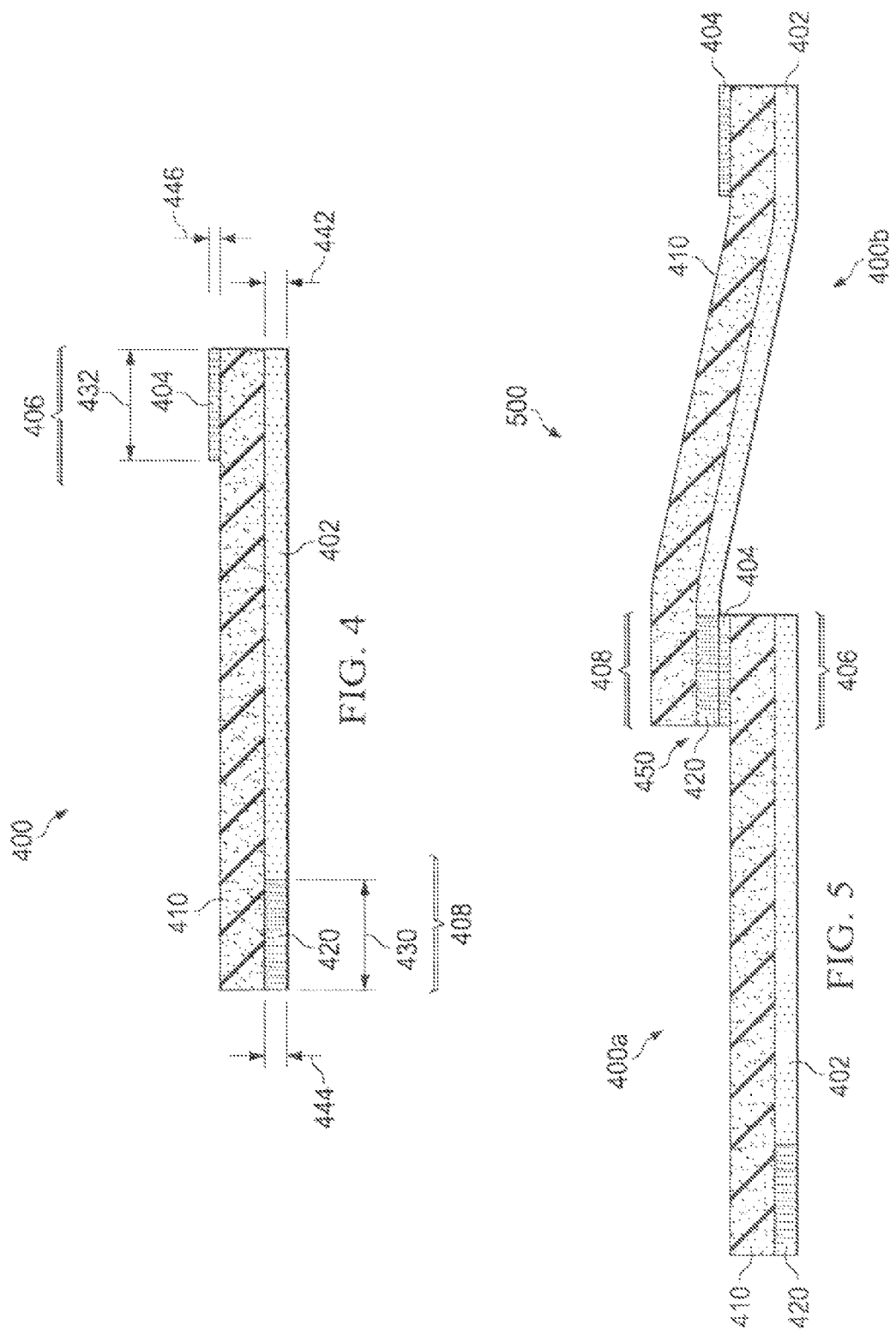

US 8,834,993 B2

THERMOPLASTIC SINGLE PLY PROTECTIVE COVERING

CROSS-REFERENCE TO RELATED APPLICATION

This disclosure is a nonprovisional application of, and thus claims priority to, U.S. Provisional Patent Application No. 61/568,125, entitled "Thermoplastic single ply protective covering" and filed on Dec. 7, 2011, which is incorporated by reference herein.

TECHNICAL FIELD

This invention relates generally to roofing products, and more particularly to single-ply, self-adhering roof covering.

BACKGROUND

Thermoplastic polyolefin (TPO) based roofing membranes are one of many types of roofing membranes available on the market today. TPO may be a melt blend or reactor blend of a polyolefin plastic, such as a polypropylene polymer, with an olefin copolymer elastomer (OCE), such as an ethylene-propylene rubber (EPR) or an ethylene-propylene-diene rubber (EPDR). Examples of commercially available TPO membranes include SURE WELD™ (Carlisle Inc.), GENFLEX™ (Omnova Solutions, Inc), ULTRAPLY™ (Firestone Building Products) and EVERGUARD TPO™ (GAF). Stretchable TPO membranes are disclosed in U.S. Pat. No. 7,666,491, which is incorporated by reference herein. Various approaches have been suggested for installing TPO membranes to a roof substrate, including mechanical fastening or adhesion.

SUMMARY

Disclosed herein include various embodiments of single-ply, self-adhering membranes. In an embodiment, an exemplary self-adhering membrane may include a membrane and a first adhesive backing disposed on a first surface of the membrane. A second adhesive backing may be disposed adjacent to the first adhesive backing on the first surface of the membrane. The second adhesive backing may extend through an edge portion of the first surface. The disclosed self-adhering membrane may further include a third adhesive backing disposed on a second surface of the membrane. The third adhesive backing may extend through an edge portion of the second surface of the membrane. In an exemplary embodiment, the second and third adhesive backings may be formulated with to have the same material while the first and second adhesive backings may be formulated to have different materials. For example, the first adhesive backing may comprise a first polymeric material making up at least about 20% of the first adhesive backing by weight, and the second and third adhesive backings may each comprise a second polymeric material making up at least about 20% of the respective adhesive backing by weight, wherein the first and second polymeric materials are different.

In an embodiment, a self-adhering membrane may include a thermoplastic polyolefin (TPO) membrane, a first adhesive backing disposed on a first surface of the TPO membrane, a second adhesive backing disposed on the first surface of the TPO membrane and adjacent to the first adhesive backing, the second adhesive backing extending through an edge portion of the first surface, and a third adhesive backing disposed on a second surface of the TPO membrane, the third adhesive backing extending through an edge portion of the second surface of the TPO membrane. A width of the edge portion of the first surface and a width of the edge portion of the second surface are each about 3 to 9 inches, and a height of the second adhesive backing is larger than a height of the third adhesive backing The first adhesive backing may comprise a filled butyl rubber based adhesive making up at least about 20% of the first adhesive backing by weight, and the second and third adhesive backings may each comprise a non-filled butyl rubber based adhesive making up at least about 20% of the respective adhesive backing by weight, wherein at least one of the second and third adhesive backings comprises about 2% to 4% polyolefin wax by weight.

In another exemplary embodiment, a method of preparing a self-adhering membrane may comprise providing a membrane, disposing a first adhesive backing on a first surface of the membrane, disposing a second adhesive backing on the first surface of the membrane and adjacent to the first adhesive backing, the second adhesive backing extending through an edge portion of the first surface, and disposing a third adhesive backing a second surface of the membrane, the third adhesive backing extending through an edge portion of the second surface of the membrane. The first adhesive backing may comprise a first polymeric material making up at least about 20% of the first adhesive backing by weight, and the second and third adhesive backings may each comprise a second polymeric material making up at least about 20% of the respective adhesive backing by weight, wherein the first and second polymeric materials are different.

BRIEF DESCRIPTION OF THE DRAWINGS

Features, aspects, and embodiments of the disclosure are described in conjunction with the attached drawings, in which:

FIG. 1 is a partial, perspective view of a membrane in accordance with the present disclosure;

FIG. 2 is a cross-sectional view of an embodiment of a single-ply, self-adhering membrane in accordance with the present disclosure;

FIG. 3 is a cross-sectional view of an embodiment of a roofing installation comprising a plurality of single-ply, self-adhering membranes shown in FIG. 2, in accordance with the present disclosure;

FIG. 4 is a cross-sectional view of an exemplary embodiment of a single-ply, self-adhering membrane with a plurality of adhesive backings, in accordance with the present disclosure;

FIG. 5 is a cross-sectional view of an embodiment of a roofing installation comprising a plurality of single-ply, self-adhering membranes shown in FIG. 4, in accordance with the present disclosure;

DETAILED DESCRIPTION

Figure 6:
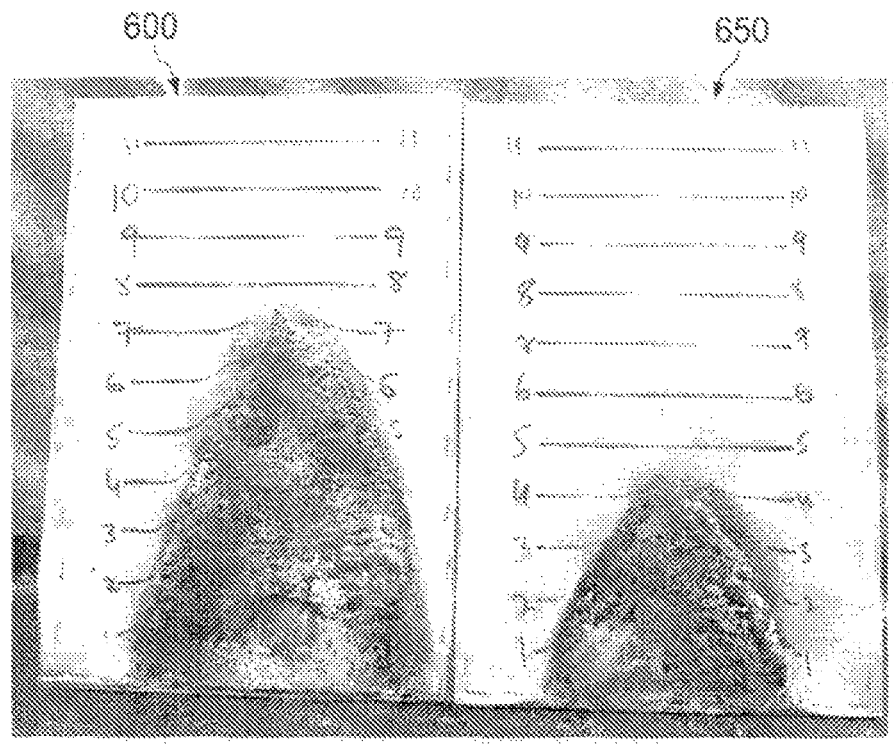
FIG. 6 is a comparison of membranes with non-filled and filled butyl adhesive backing after a fire test.

FIG. 1 is a partial, perspective view of a membrane 100. The membrane 100 comprises a cap layer 102 and a core layer 104. In an embodiment, the membrane 100 may further include a scrim layer 106 substantially sandwiched between the cap layer 102 and the core layer 104. The scrim may be a woven, nonwoven, or knitted fabric composed of continuous strands of material used for reinforcing or strengthening membranes. The scrim is generally the strongest layer in the composite. The fabric can contribute significantly to the tensile strength of the roofing membrane and provide for dimensional stability. In an example, the fabric reinforcement comprises a polyester yarn based scrim. Glass fiber based scrims may also be used for situations where additional weight and/or improved dimensional stability are desired. Each of the cap layer 102 and core layer 104 may be made of a material, such as TPO. When installed on the roof of a house, the membrane 100 may be oriented such that the cap layer 102 is on the weather side, facing upward toward the direction of sunlight; the core layer 104 may be oriented such that the core layer 104 is on the deck side, facing downward toward the roof deck. The membrane 100 may be installed on a roof substrate (not shown) using a variety of approaches. One approach may employ mechanical fastening with screws and anchor plates through the membrane 100 and into a roof substrate. Another approach is to coat the deck side of the membrane 100 with an adhesive, such as pressure sensitive adhesive, and laminating the membrane 100 to the roof substrate.

FIG. 2 is a cross-sectional view of an embodiment of a self-adhering membrane 200 operable to be laminated to a roof substrate. The self-adhering membrane 200 may include the membrane 100 illustrated in FIG. 1 and an adhesive backing 202 disposed on the deck side of the membrane 100. The adhesive backing 202 may extend from one edge of the membrane 100 to an opposing edge of the membrane 100, thereby substantially covering the deck-side surface of the membrane 100. The adhesive backing 202 may include a variety of pressure sensitive adhesives, which allows for forming of bond with a substrate without curing. In an embodiment, the membrane 200 may include an additional adhesive backing 204 disposed on the weather side of the membrane 100. The adhesive backing 204 may extend through an edge portion 206 of the membrane 100.

FIG. 3 is a cross-sectional view of an embodiment of a roofing installation 300 comprising a plurality of self-adhering membranes. The self-adhering membranes 200a, 200b of the roofing installation 300 may be substantially similar to the self-adhering membrane 200 shown in FIG. 2, each comprising an adhesive backing 202 disposed on the deck side of a membrane 100 and an additional adhesive backing 204 disposed on the weather side of the membrane 100. The roofing installation 300 may be installed by disposing the membrane 200a on a roof substrate (not shown) and applying pressure against the weather side of the membrane 200a to allow the adhesive backing 202 to bond with the roof substrate. The membrane 200b may be disposed on the roof substrate at a location that is proximate to the membrane 200a such that an edge portion 306 of the membrane 200a is overlapped by an edge portion 308 of the membrane 200b. In this orientation, the edge portion 308 of the membrane 200a is operable to cooperate with the edge portion 306 of the membrane 200a to form a seam. In an embodiment, the seam between the edge portions 306, 308 may be formed using an adhesive tape disposed therebetween.

In the illustrated embodiment, the weather-side adhesive backing 204 of the membrane 200a may be overlapped by the edge portion 308 of the membrane 200b. As such, the deck-side adhesive backing 202 of the membrane 200b and the weather-side adhesive backing 204 of the membrane 200a may bond with each other and form a seam. It is to be appreciated that the adhesive backings 202, 204 may be formulated with butyl rubber-based pressure sensitive adhesive and allow the membranes 200a, 200b to be installed with minimal field seam preparation. The seam formed by the butyl-rubber based adhesives in the adhesive backings 202, 204 may have a seam peel strength measured at about three to five pounds per linear inch according to ASTM D413 procedures. Such a seam may suffer from degradation and seam opening; higher seam peel strength may be desirable in some applications.

FIG. 4 is a cross-sectional view of an exemplary embodiment of a self-adhering membrane 400. The self-adhering membrane 400 includes a membrane 410 and a first adhesive backing 402 disposed on a first surface of the membrane 410. The configuration of the membrane 410 may be similar to that of the membrane 100 discussed above. The first surface of the membrane 410 may be a deck-side surface, and the first adhesive backing 402 may substantially cover the deck-side surface of the membrane 410 except an edge portion 408 of the deck-side surface. A second adhesive backing 420 may be disposed adjacent to the first adhesive backing 402 on the deck-side surface of the membrane 410. The second adhesive backing 420 may extend through the edge portion 408 of the deck-side surface. The disclosed self-adhering membrane 400 may further include a third adhesive backing 404 disposed on a second, weather-side surface of the membrane 410. The third adhesive backing 404 may extend through an edge portion 406 of the weather-side surface of the membrane 410.

FIG. 5 is a cross-sectional view of an embodiment of a roofing installation 500 comprising a plurality of self-adhering membranes. The self-adhering membranes 400a, 400b of the roofing installation 500 may be substantially similar to the self-adhering membrane 400 shown in FIG. 4, each comprising first and second adhesive backing 402, 420 disposed on the deck side of a membrane 410 and a third adhesive backing 404 disposed on the weather side of the membrane 410. The roofing installation 500 may be installed by disposing the membrane 400a on a roof substrate (not shown) and applying pressure against the weather side of the membrane 400a to allow the first adhesive backing 402 to bond with the roof substrate. The membrane 400b may be disposed on the roof substrate at a location that is proximate to the membrane 400a such that the edge portion 406 of the membrane 400a is overlapped by the edge portion 408 of the membrane 400b. In this orientation, the second adhesive backing 420 of the membrane 400b and the third adhesive backing 404 of the membrane 400a may bond with each other and form a seam 450.

Referring to FIGS. 4 and 5, in an embodiment, the edge portion 408 of the deck-side surface may have a first width 430, and the edge portion 406 of the second surface may have a second width 432. In an embodiment, the first and second widths 430, 432 may be substantially the same. In an exemplary embodiment, the first and second widths 430, 432 may be about three to nine inches. In an exemplary embodiment, the first and second widths 430, 432 may be about six inches.

In an embodiment, the first, second, and third adhesive backings 402, 420, 404 may each have a substantially uniform height. In an embodiment, a height 442 of the first adhesive backing 402 and a height 444 of the second adhesive backing 420 are substantially the same. In an embodiment, the height 444 of the second adhesive backing 420 and a height 446 of the third adhesive backing 404 may be the same. In another embodiment, to reduce wrinkling of the adhesive when the seam 450 is formed, the height 446 of the third adhesive backing 404 may be reduced to an amount less than the height 444 of the second adhesive backing 420. In an exemplary embodiment, the height 446 of the third adhesive backing 404 may be about two to six mils while the height 444 of the second adhesive backing 420 may be about six to twelve mils. In an exemplary embodiment, heights 444 and 446 optimized for strength and lack of wrinkling may be about eight to twelve mils and four to six mils, respectively.

The first, second, and third adhesive backings 402, 420, and 404 may each comprise a hot melt adhesive coating, a hot melt adhesive tape, or an extruded adhesive tape. In an exemplary embodiment, the adhesive backings 402, 420, and 404 may each comprise a hot melt adhesive coating to allow for a more cost effective manufacturing process and more adaptable for wide width applications. In an embodiment, the first adhesive backings 402 may be formulated to include a first polymeric material while the second and third adhesive backings 420, 404 may be formulated to include a second polymeric material different from the first polymer material. In the exemplary embodiment, the first and second materials may make up at least 20 weight % of the respective adhesive backings 402, 420, and 404, respectively. By having multiple adhesive backings 402, 420 on the deck side of the membrane 410 and using of different adhesive formulations for the adhesive backings 402, 420, different portions of the self-adhering membrane 400 may have a different material property tuned for different design goals. For example, the first adhesive backings 402 may be formulated to include at least 20 weight % filled butyl rubber based adhesive to allow for good fire retardation performance while the second and third adhesive backings 420, 404 may be formulated to include at least 20% non-filled butyl rubber based adhesive to allow for good seam peel strength. In an exemplary embodiment, an first adhesive backings 402 having optimized strength and fire retardation performance may include about 50 to 80 weight % filled butyl rubber based adhesive; second and third adhesive backings 420, 404 having optimized strength and fire retardation performance may include about 50 to 80 weight % non-filled butyl rubber based adhesive.

The superior fire retardation performance of a filled butyl rubber based adhesive over a non-filled butyl rubber based adhesive is illustrated in FIG. 6. FIG. 6 is a comparison of the spread of fire flame through a single-ply membrane 600 having a non-filled butyl rubber based adhesive backing (non-shown) and a single-ply membrane 650 having a filled butyl rubber based adhesive backing (non-shown). As shown, the spread of flame per modified ASTM E 108 fire testing through the membrane 600 is almost twice the spread of flame through the membrane 650.

On the other hand, the superior seam peel strength of a non-filled butyl rubber based adhesive over a filled butyl rubber based adhesive is illustrated in Table 1 below. Table 1 compiles the 180° T-peel strength data of edge seams of Example 1 and Comparative Example 1. In example 1, an edge seam is formed between two TPO membranes with a non-filled butyl rubber based adhesive. The adhesive of example includes at least 20 wt. % non-filled butyl rubber. In comparative example 1, an edge seam is formed between two TPO membranes with at least one filled butyl rubber based adhesive. The adhesive of comparative example 1 includes at least 20 wt. % filled butyl rubber. The 180° T-peel strength of the edge seams are measured according to ASTM D 413 Standard Test Methods. As shown in Table 1, the peel strength of Example 1 is greater than that of Comparative Example 1 by at least several factors.

It is to be appreciated that the first adhesive backing 402 and the second and third adhesive backings 420, 404 may be formulated differently in other respects to achieve other combinations of performance goals. For example, the second and third adhesive backings 420, 404 may include selective, functionalized polyolefin wax to enhance the heat resistance of the second and third adhesive backing 420, 404 without scarifying the adhesion value. As such, an improvement in heat resistance of the second and third adhesive backings 420, 404 translates into an improvement in the heat resistance of the seam formed by the second and third adhesive backings 420, 404. In an embodiment, the second and third adhesive backings 420, 404 may be formulated to include about two to four weight % polyolefin wax.

Adhesion strength data of Example 2 and Comparative Examples 2 are shown in Tables 2 below. In Example 2, a non-filled butyl rubber based adhesive comprising 3.5 weight % functionalized polyolefin is tested. In Comparative Example 2, a filled butyl rubber based adhesive without any functionalized polyolefin is tested. As shown in Table two, the addition of the functionalized polyolefin to the non-filled butyl rubber based adhesive in Example 2 does not sacrifice the superior adhesion over that of the filled butyl rubber based adhesive in Comparative Example 2. As such, improved heat resistance may be realized without sacrificing adhesion strength.

TABLE 2

| | | RT | | 158 F. Dry |
|---|---|---|---|---|
| | | 1 day | 28 days | 28 days |
| TPO overlapping adhered seam strength (lbs/in) | Comparative example 2 | 3.37 (0.45) | 3.14 (0.27) | 2.82 (0.19) |
| | Example 2 | 18.772 (1.73) | 21.508 (2.14) | 21.222 (1.30) |

180° Averaged T-peel Strength (pounds per linear inch) per ASTM D413

Figure 7:
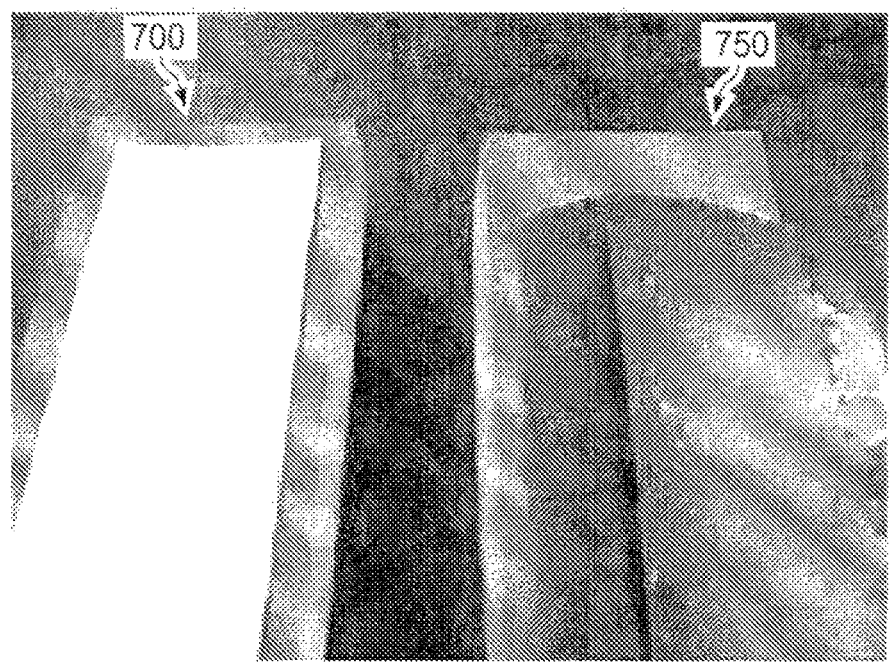
FIG. 7 is a comparison of membranes after a heat resistance test.

Moreover, the superior heat resistance performance of an adhesive formulation with oxidized polyolefin wax additive over an adhesive without such an additive is illustrated in FIG. 7. FIG. 7 is a comparison of a non-filled butyl rubber based adhesive 700 comprising 3.5 weight % functionalized polyolefin wax to a non-filled butyl rubber based adhesive 750 without functionalized polyolefin wax added. The adhesives 700, 750 were heated to 240° F. according to ASTM D413 Testing Methods, and as shown, the adhesive 700 substantially maintains its solid form without melting while adhesive 750 deforms noticeably.

Figure 8:
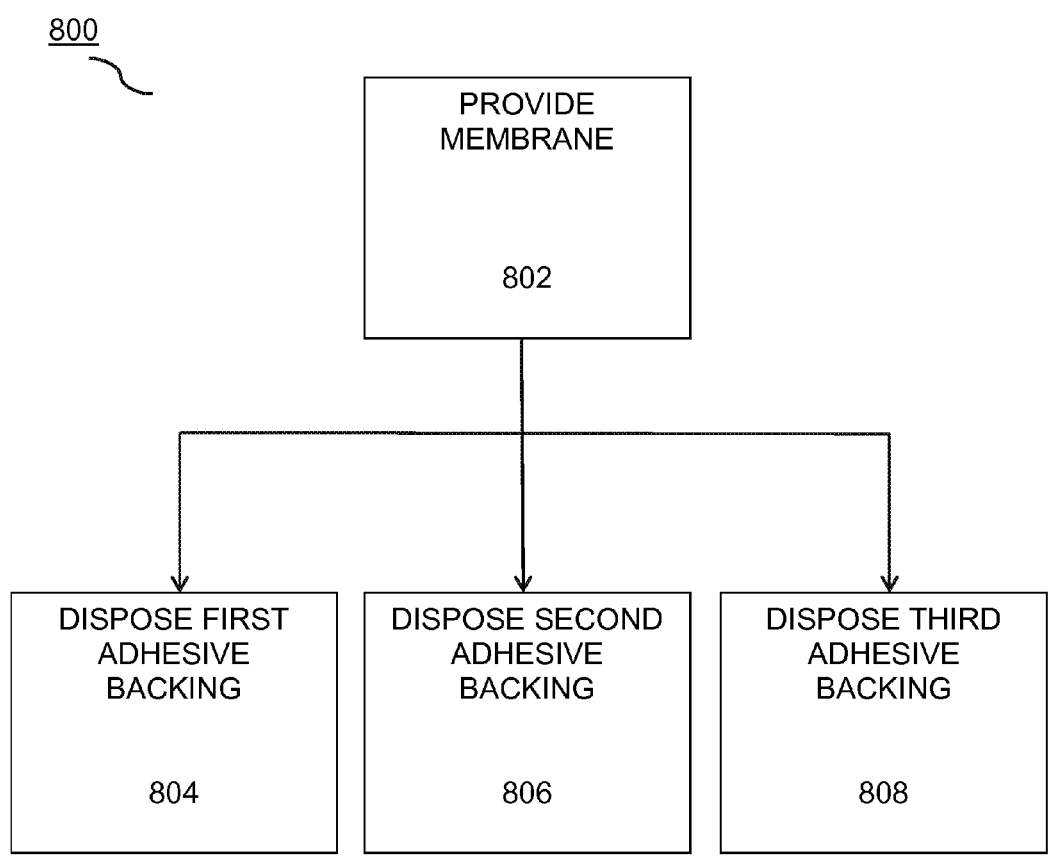
FIG. 8 is a flow diagram showing a method of preparing a self-adhering membrane in accordance with the present disclosure.

FIG. 8 is a flow diagram illustrating an exemplary embodiment of a method 800 for preparing a self-adhering membrane of the present disclosure. It is to be appreciated that the method 800 may be use to prepare any embodiments of the

TABLE 1

180° Averaged T-peel Strength (pound per linear inch) per ASTM D413

| | | Instant at room temperature | 24 hrs at room temperature | 14 days at −20° C. | 14 days 158° F. Oven | 14 day 95% Humid & 140° F. Oven | 28 days 158° F. Oven |
|---|---|---|---|---|---|---|---|
| Seam Strength (PLI) | Comparative Example 1 | 3.370 | 4.582 | 4.097 | 2.298 | 3.304 | 2.821 |
| | Example 1 | 13.96 | 13.26 | 16.091 | 21.545 | 15.944 | 19.472 | self-adhering membrane disclosed herein, including but not limited to membranes 400, 600, and 650. The method 800 may include a step 802 comprising providing a membrane similar to the membrane 100 disclosed herein. The method 800 may further include a step 804 comprising disposing a first adhesive backing on a first surface of the membrane. The first adhesive backing disposed in step 804 may be similar to adhesive backing 402 disclosed herein and comprises a first polymeric material making up at least about 20% of the first adhesive backing by weight. The method 800 may further include a step 806 comprising disposing a second adhesive backing on the first surface of the membrane and adjacent to the first adhesive backing, the second adhesive backing extending through an edge portion of the first surface. The method 800 may further include a step 808 comprising disposing a third adhesive backing on a second surface of the membrane, the third adhesive backing extending through an edge portion of the second surface of the membrane. The second and third adhesive backings may be similar to the adhesive backings 420, 404 disclosed herein and each may comprise a second polymeric material making up at least about 20% of the respective adhesive backing by weight. In an embodiment, the first and second polymeric materials are different. For example, in an embodiment, the first polymeric material may be a filled butyl rubber based adhesive and the second polymeric material may be a non-filled butyl rubber based adhesive.

In an embodiment, disposing the second adhesive backing in step 806 may comprise forming the second adhesive backing to have a width of about 3 to 9 inches across the edge portion of the first surface, and disposing the third adhesive backing in step 808 may comprise forming the third adhesive backing to have a width of about 3 to 9 inches across the edge portion of the second surface. In an embodiment, the width of the second adhesive backing and the width of the third adhesive backing formed in steps 806, 808 are substantially the same.

In an exemplary embodiment, disposing the second adhesive backing in step 806 may comprise forming the second adhesive backing to have a first height, and disposing the third adhesive backing in step 808 may comprise forming the third adhesive backing to have a second height, in which the first height may be larger than the second height. In an embodiment, the first height is about eight to twelve mils, and the second height is about four to six mils.

It is to be appreciated that in an embodiment, the steps 804, 806, and 808 may be performed substantially simultaneously in a single run to minimize the production time. In another embodiment, some or all of the steps 804, 806, and 808 may be performed at different points in time. For example, steps 804 and 806 may be performed in a single run to dispose the first and second adhesive backings on the first surface of the TPO membrane and the step 808 may be performed in a separate run to dispose the third adhesive backing on the second surface of the TPO membrane. Other ordering of the steps 804, 806, and 808 may be used in accordance with the principles of the present disclosure.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than approximately one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A self-adhering membrane, comprising:
   a thermoplastic polyolefin (TPO) membrane;
   a first adhesive backing disposed on a first surface of the TPO membrane;
   a second adhesive backing disposed on the first surface of the TPO membrane and adjacent to the first adhesive backing, the second adhesive backing extending through an edge portion of the first surface; and
   a third adhesive backing disposed on a second surface of the TPO membrane, the third adhesive backing extending through an edge portion of the second surface of the TPO membrane;
   wherein a width of the edge portion of the first surface and a width of the edge portion of the second surface are each about 3 to 9 inches, and a height of the second adhesive backing is larger than a height of the third adhesive backing;
   wherein the first adhesive backing comprises a filled butyl rubber based adhesive making up at least about 20% of the first adhesive backing by weight;
   wherein the second and third adhesive backings each comprise a non-filled butyl rubber based adhesive making up at least about 20% of the respective adhesive backing by weight; and
   wherein at least one of the second and third adhesive backings comprises about 2% to 4% polyolefin wax by weight.

2. The self-adhering membrane of claim 1, wherein the first adhesive backing comprises about 50 to 80% filled butyl rubber based adhesive by weight.

3. The self-adhering membrane of claim 1, wherein second and third adhesive backings each comprise about 50 to 80% non-filled butyl rubber based adhesive by weight.

4. The self-adhering membrane of claim 1, wherein the at least one of the second and third adhesive backings comprises about 3.5% polyolefin wax by weight.

5. The self-adhering membrane of claim 1, wherein the width of the edge portion of the first surface and the width of the edge portion of the second surface are each about 6 inches.

6. The self-adhering membrane of claim 1, wherein a width of the edge portion of the first surface and a width of the edge portion of the second surface are substantially the same.

7. The self-adhering membrane of claim 1, wherein the height of the second adhesive backing is about 6 to 12 mils, and the height of the third adhesive backing is about 2 to 6 mils.

8. The self-adhering membrane of claim 1, wherein the height of the second adhesive backing is about 8 to 12 mils, and the height of the third adhesive backing is about 4 to 6 mils.

9. The self-adhering membrane of claim 1, wherein a width of the second adhesive backing is substantially the same as a height of the third adhesive backing 10. The self-adhering membrane of claim 1, wherein the first, second, and third adhesive backings each comprise a hot melt adhesive coating, a hot melt adhesive tape, or an extruded adhesive tape.

11. A method of preparing a self-adhering membrane, comprising:
    providing a thermoplastic polyolefin (TPO) membrane;
    disposing a first adhesive backing on a first surface of the TPO membrane;
    disposing a second adhesive backing on the first surface of the TPO membrane and adjacent to the first adhesive backing, the second adhesive backing extending through an edge portion of the first surface; and
    disposing a third adhesive backing a second surface of the TPO membrane, the third adhesive backing extending through an edge portion of the second surface of the TPO membrane;
    wherein disposing the second adhesive backing comprises forming the second adhesive backing to have a width of about 3 to 9 inches across the edge portion of the first surface, and a second adhesive backing height;
    wherein disposing the third adhesive backing comprises forming the third adhesive backing to have (i) a width of about 3 to 9 inches across the edge portion of the second surface and (ii) a third adhesive backing height, the second adhesive backing height being larger than the third adhesive backing height;
    wherein the first adhesive backing comprises a filled butyl rubber based adhesive making up at least about 20% of the first adhesive backing by weight;
    wherein the second and third adhesive backings each comprise a non-filled butyl rubber based adhesive making up at least about 20% of the respective adhesive backing by weight; and
    wherein at least one of the second and third adhesive backings comprises about 2% to 4% polyolefin wax by weight.

12. The method of claim 11, wherein the second adhesive backing height is about 6 to 12 mils, and the third adhesive backing height is about 2 to 6 mils.

13. The method of claim 11, wherein the second adhesive backing height is about 8 to 12 mils, and the third adhesive backing height is about 4 to 6 mils.

\* \* \* \* \*